US009273456B1

(12) United States Patent
Miles et al.

(10) Patent No.: US 9,273,456 B1
(45) Date of Patent: Mar. 1, 2016

(54) LEACHING TUBE

(71) Applicants: Winferd R. Miles, Lombard, IL (US); Garry R. Miles, Lombard, IL (US)

(72) Inventors: Winferd R. Miles, Lombard, IL (US); Garry R. Miles, Lombard, IL (US)

(73) Assignee: Winferd R. Miles, Paris, TN (US)

( * ) Notice: Subject to any disclaimer, the term of this patent is extended or adjusted under 35 U.S.C. 154(b) by 0 days.

(21) Appl. No.: 14/489,888

(22) Filed: Sep. 18, 2014

(51) Int. Cl.
*E02B 11/00* (2006.01)
*E03F 1/00* (2006.01)
*C02F 3/28* (2006.01)
*C02F 103/06* (2006.01)

(52) U.S. Cl.
CPC . *E03F 1/002* (2013.01); *C02F 3/28* (2013.01); *C02F 2103/06* (2013.01)

(58) Field of Classification Search
USPC ........ 138/122, 129, 144, 109; 405/36, 42–45, 405/47, 49
See application file for complete search history.

(56) References Cited

U.S. PATENT DOCUMENTS

| 31,614 | A | | 3/1861 | Mayall | |
|---|---|---|---|---|---|
| 1,675,316 | A | * | 6/1928 | Russell | 138/109 |
| 2,807,505 | A | | 9/1957 | Weitzel | |
| 3,006,818 | A | * | 10/1961 | Lappala et al. | 202/234 |
| 3,302,408 | A | | 2/1967 | Schmid | |
| 3,333,422 | A | | 8/1967 | Neyland | |
| 3,502,114 | A | * | 3/1970 | Hay, Jr. | 138/129 |
| 3,744,256 | A | | 7/1973 | Cobb et al. | |
| 3,830,067 | A | | 8/1974 | Osborn et al. | |
| 3,832,855 | A | | 9/1974 | Maroschak | |
| 4,140,422 | A | | 2/1979 | Crumpler, Jr. et al. | |
| 4,183,696 | A | | 1/1980 | Auriemma | |
| 4,588,325 | A | | 5/1986 | Seefert | |
| 4,759,661 | A | | 7/1988 | Nichols et al. | |
| 5,087,151 | A | | 2/1992 | DiTullio | |
| 5,401,116 | A | | 3/1995 | Nichols | |
| 5,954,451 | A | * | 9/1999 | Presby | 405/49 |
| 5,997,735 | A | | 12/1999 | Gorton | |
| 6,375,388 | B1 | | 4/2002 | Zoeller et al. | |
| 6,428,239 | B1 | | 8/2002 | Davis | |
| 6,702,517 | B2 | * | 3/2004 | Goddard | 405/45 |
| 7,306,400 | B1 | | 12/2007 | Brochu et al. | |
| 7,351,006 | B2 | | 4/2008 | Burnes et al. | |
| 7,384,212 | B2 | | 6/2008 | Currivan | |
| 7,413,381 | B1 | | 8/2008 | Bracone, Jr. | |
| 7,517,172 | B2 | | 4/2009 | Sipaila | |
| 7,614,822 | B1 | | 11/2009 | Burritt et al. | |

(Continued)

FOREIGN PATENT DOCUMENTS

GB 2051295 A * 1/1981

*Primary Examiner* — Sunil Singh
(74) *Attorney, Agent, or Firm* — Erickson Law Group, PC

(57) ABSTRACT

One embodiment of a spiral tube base 10 that has an outer covering of a geogrid material 14 or a geotextile material. The spiral tube base 10 is typically made of a hard, durable material, such as PVC pipe, so that it can be buried within the earth and can be used in a variety of areas and soil conditions. Geogrid material 14 is wrapped around the outside of the spiral tube 10. The geogrid material 14 and the spiral ribs 11 allow liquids or effluent to gather within the tube, while the geogrid openings 16 and the spiral openings 12 of the tube allow effluent to move from within the tube into the surrounding soil. One opening of the spiral tube base 10 can be covered with an inlet plate 22 that holds an intake-pipe cap 24 and provides an entrance for a pipe from a septic tank. A distal opening of a leaching tube or the distal opening in a continuous line of leaching tubes that are connected together can be covered with an end plate 30. Other embodiments are described.

33 Claims, 6 Drawing Sheets

(56) References Cited

U.S. PATENT DOCUMENTS

| | | |
|---|---|---|
| 7,632,408 B1 | 12/2009 | Everson |
| 7,727,388 B1 | 6/2010 | Houck |
| 7,762,740 B1 | 7/2010 | Burritt et al. |
| 7,857,545 B2 | 12/2010 | Burcham |
| 7,909,535 B2 | 3/2011 | Samara |
| 8,007,201 B2 | 8/2011 | Currivan |
| 8,142,106 B2 | 3/2012 | Couch et al. |
| 8,623,200 B2 | 1/2014 | Williamson |
| 8,636,444 B2 | 1/2014 | Currivan |
| 2005/0042031 A1* | 2/2005 | Mirzakhanov ............ 405/36 |
| 2006/0147270 A1* | 7/2006 | Parker ............ 405/50 |

* cited by examiner

LEACHING TUBE

CROSS-REFERENCE TO RELATED APPLICATIONS

Not applicable

FEDERALLY SPONSORED RESEARCH

Not applicable

BACKGROUND

Prior Art

The following is a tabulation of some prior art that presently appears relevant:

| U.S. Patents | | |
|---|---|---|
| Pat. No. | Issue Date | Patentee |
| 8,636,444 | 2014 | Currivan |
| 8,007,201 | 2011 | Currivan |
| 7,384,212 | 2008 | Currivan |
| 5,401,116 | 1995 | Nichols |
| 4,759,661 | 1988 | Nichols et ai. |
| 4,183,696 | 1978 | Auriemma |
| 7,517,172 | 2009 | Sipaila |
| 7,351,006 | 2008 | Burnes et al. |
| 7,306,400 | 2007 | Brochu |
| 6,375,388 | 2002 | Zoeller etal. |
| 7,413,381 | 2008 | Bracone |
| 7,614,822 | 2009 | Burritt et al. |
| 7,762,740 | 2010 | Burritl et at. |
| 7,632,408 | 2009 | Everson |
| 7,727,388 | 2010 | Houck |
| 7,857,545 | 2010 | Burcham |
| 8,142,106 | 2012 | Couch et al. |
| 3,333,422 | 1967 | Neyland |
| 4,140,422 | 1979 | Crumpler et al. |
| 3,832,855 | 1974 | Maroschak |
| 3,830,067 | 1974 | Osborn et al. |
| 3,744,256 | 1973 | Cobb et al. |
| 3,302,408 | 1967 | Schmid |
| 2,807,505 | 1957 | Weitzel |
| 31,614 | 1861 | Mayall |
| 5,087,151 | 1992 | DiTullio |
| 4,588,325 | 1986 | Seefert |
| 5,997,735 | 1999 | Gorton |
| 7,909,535 | 2011 | Samara |
| 6,428,239 | 2002 | Davis |
| 8,623,200 | 2014 | Williamson |

Nonpatent Literature Documents

Hassan Dar, G., Soil Microbiology and Biochemistry, New India Publishing (August 2009)
Henkenius, M., Popular Mechanics, "How It Works: Septic System" (August 1990)
U.S. Environmental Protection Agency: Office of Water, "Decentralized Systems Technology Fact Sheet: Septic Tank Leaching Chamber" (September 2009)
U.S. Environmental Protection Agency: Office of Wastewater Management, "Septic Systems Fact Sheet" (October 2008)
U.S. Environmental Protection Agency: Office of Water, "Decentralized Systems Technology Fact Sheet: Sept Tank—Soil Absorption Systems" (September 1999)

Septic treatment systems are used to treat and dispose of effluent, or wastewater, from residences and commercial buildings. Septic treatment systems are onsite systems that do not involve central wastewater collection and treatment as in municipal water treatment. A typical septic treatment system includes a septic tank and a leach field, or drain field, and the entire system is located underground. The septic tank is a conduit that essentially digests organic matter and separates floatable matter, such as oils and grease, and non-floatable solids from the effluent. Effluent is then discharged from the septic tank into a distribution pipe that drains into a leach field. The leach field contains a leach-field system that either is composed of gravel or is gravelless. The leach-field system is designed to slowly release effluent into the soil, which purifies the effluent.

A leach field serves two key functions: to dispose of effluent from septic tanks and to distribute effluent in a manner allowing adequate, natural wastewater treatment in the soil before any harmful contaminants reach the underlying groundwater aquifer. Leach-field systems are integral in removing or neutralizing pollutants like disease-causing pathogens, nitrogen, phosphorus, and other contaminants. When any part of the septic system is inappropriate or inadequate based on the conditions or other factors, failures occur, including contamination of underground water aquifers. The most serious documented problems involve contamination of surface waters and ground water with disease-causing pathogens and nitrates. When working properly, a leach-field system allows the surrounding soil to filter the pollutants in the effluent before the effluent reaches the underlying groundwater aquifer. The soil reduces or completely removes harmful contaminants from the effluent.

Leach fields, or drain fields, are typically classified as either gravel or gravelless systems. Historically, gravel systems (e.g., gravel and pipe systems) have been used in leach fields. In gravel systems, perforated pipes that distribute the effluent are placed over a layer of gravel underground. Then four inches of additional rock are placed around the pipe and two inches above the pipe. The installation of a gravel system creates a problem in that the drain field could be compromised by the compaction of moist soil resulting from the use of heavy equipment that is necessary for the installation of gravel. Compaction of the soil reduces the percolation of the effluent and reduces effluent filtration.

Additionally, gravel and pipe leach-field systems require a lot of space and in most cases, an adequate amount of space is not available. Gravel and pipe systems also require a large amount of gravel that must be hauled in by a dump truck. The time and labor-consuming installation of a pipe and gravel system, along with space limitations, creates higher costs and installation difficulties. Thus, the pipe and gravel drain-field system has grown out of use by septic system installation professionals.

The advantages of a gravelless system when compared to a gravel system are well known in the industry. The use of a gravelless system decreases overall costs, including transportation and installation, and reduces the number of trees that must be removed from the drain-field lot for installation. Advantages of a gravelless system include the following: easier and faster installation, less compaction of soil within the trenches where the chambers are installed, less expensive in areas where gravel must be transported over long distances, and allows for less intrusion of soil and silt into the drain field—extending the useful life of the drain field. Furthermore, gravelless systems have greater storage volumes than gravel trenches or beds, the inspection of gravelless chambers is easier, and the need for gravel is eliminated. Most importantly, a smaller environmental footprint is required for gravelless chambers and some states allow up to a 50 percent reduction in drainfield size compared to a gravel system.

Gravelless drain-field systems include the use of plastic tubes or pipes perforated with holes throughout and covered with spun-bonded permeable nylon filter fabric. The perforated pipes are typically 20 to 30.5 cm (8 to 12 inches) in diameter and are placed in a 30.5 cm (12 inch) to 61 cm (24 inch) underground trench. The problem with the use of permeable filter fabric is that it has a high risk of getting damaged during installation and has an even higher risk of clogging over time, which makes the permeable filter fabric useless. Because it is not possible to clean the filter fabric to reuse it again, the filter fabric would need to be replaced. It is the mesh-like composition of the permeable filter fabric that creates the risk of clogging, which decreases the percolation of the effluent into the soil and causes a back-up of the septic system. The back-up of the septic system is typically identified when there is a pond of effluent above ground and a foul odor permeates the air.

The benefit of filter-fabric covered pipe is that it allows for installation in areas with steep slopes using only small equipment and in hand-dug trenches where conventional gravel systems are not possible. However, filter-fabric covered perforated pipe cannot be installed where gravel systems will not function properly, such as fine sandy or organic-rich, coastal-plain soils with shallow groundwater.

Gravelless drain-field systems are not limited to filter-fabric covered perforated pipe. Gravelless systems also include the use of large arch-shaped segments of corrugated rigid plastic perforated with small holes. These corrugated arch-shaped chamber systems, or leaching chambers, have been used for over 20 years, while the filter-fabric covered perforated pipe and the gravel systems have been used for over 40 years. Currently, at least one-third of all septic systems installed in the U.S. are the corrugated rigid plastic arch-shaped chamber systems.

Arch-chamber systems consist of corrugated rigid plastic arch-shaped chambers perforated with small holes along the top and sides, have no bottom, and are available in a variety of sizes. Depending on the drain-field size requirements, one or more chambers are typically connected to form an underground drainfield network. Because of their open-bottom design, arch-shaped chambers allow more of the soil profile to be used for percolation when compared to a gravel system, which releases effluent into gravel beds through tiny holes in perforated pipes and not directly into the soil for purification. Arch-shaped chambers are suitable when drain field space is limited or where water tables or bedrock limit the depth of the drain field.

Currently, the brand name of the most commonly used arch-chamber system is called the Infiltrator© system, U.S. Pat. No. 4,759,661 (Nichols et al., 1988) and U.S. Pat. No. 5,401,116 (Nichols, 1995). These leaching chambers consist of injection-molded segments of bottomless corrugated arches made of high-density polyethylene (rigid plastic) with very small slots or holes along the top and sides. These modular, plastic-arch segments vary in size from 50 cm to 102 cm (20 to 40 inches) wide, 30.5 cm (12 inches) high, and are typically 1.23 m to 2.44 m (four to eight feet) in length. Each chamber segment is designed to mechanically interlock with the downstream chamber segment, forming a complete drainfield trench that consists of an inlet plate and a solid-end plate at the distal end of the chamber line. The Infiltrator© system was designed to solve the issues associated with typical stone and pipe or gravel and pipe systems and the gravelless filter-fabric wrapped perforated pipe systems.

Although the Infiltrator's© plastic arch-chamber segments were designed to solve the issues associated with the prior art, the arch-chamber segments have been known to cave-in or collapse over time, necessitating replacement. The corrugated rigid plastic arch-segments are not as durable and long-lasting as a pipe. Furthermore, effluent changes the composition of the soil underneath the arch-chamber, which results in a reduction of soil structure. This reduction of soil structure combined with external factors, such as rain, create conditions underneath the arch-chamber that turn the soil into sludge. Evaporation is inhibited because the arch chambers are essentially solid plastic with only a few holes punctured along the top and sides, essentially creating a blanket over the effluent. Evaporation is an essential step in the purification of effluent because as much as 60 percent of the liquid evaporates into the air, while the rest is absorbed by plant roots. As a result of the sludge, the soil is unable to filter the effluent properly, creating an environmental hazard.

Nitrogen compounds, suspended solids, organic and inorganic materials, and bacteria and viruses must be reduced before effluent is considered purified. These pollutants are reduced or completely removed from the effluent by the soil into which the effluent drains from the leaching chambers. Soil aeration, the presence of oxygen in the soil, and good soil drainage promote nitrification. Nitrification of septic tank effluent is necessary to reduce or eliminate hazardous pollutants and is a biologically sensitive process that is dependent on soil environment. Nitrifying bacteria, found only in the top several feet of soil, converts poisonous organic nitrogen and urea components in effluent into ammonium, nitrites, and nitrates. Nitrates, in turn, are tapped by the amino acids in plant roots and become plant food. Denitrification occurs when oxygen diffusion rates in soil are insufficient to meet the demands from microbial respiration, resulting in sludge. This situation arises when soil is near or at water saturation level and oxygen diffusion is slowest, as is the case when the effluent is essentially covered on top with a solid material, such as the arch-chamber segments, and evaporation and oxygenation is inhibited.

The small perforated holes in the corrugated plastic arch-chamber system are frequently compacted or obstructed by rocks or other material, which further reduces evaporation and oxygenation of the effluent. It is also not possible to clean these small holes. Also, a considerable amount of gas is created inside of the septic tank and exits through the distribution pipe and into the leach field. Any gas that is trapped underneath the arch-chamber kills the bacteria that are essential for breaking down hazardous pollutants.

Currently, the Infiltrator© chamber system is not capable of being used in many situations and soil conditions. In consideration of the problems associated with gravel and perforated pipe, mesh-fabric covered perforated pipe, and arch-chamber systems, there remains a need for a gravelless leach-field system that is lightweight, easily installed in a variety of soils, and that maintains its capacity for exfiltration and percolation over time without the need for costly replacement or repairs.

SUMMARY

In accordance with one embodiment a leaching tube, comprising: a tube for burial in the earth to disperse or gather liquids, the tube having a semirigid-spiral, or helical, form with spiral, or helical, ribs and spiral, or helical, openings along the length of the tube, with the tube wrapped in a flexible material having grid openings.

Advantages

Accordingly several advantages of one or more aspects are as follows: to provide a leaching conduit for effluent or underground water that provides structure and stability to the surrounding soil, that is resistant to caustic liquids, that promotes oxygenation above the leaching conduit, that promotes gas filtration through the soil, that provides a greater area for the percolation of effluent by providing 360 degrees of exfiltration to the surrounding soil, that allows for higher removal of pollutants from effluent, that is easier to transport and easier to install because it is lightweight, that is easy to manufacture, and that is modifiable to a variety of soil conditions and space constraints. Other advantages of one or more aspects will be apparent from a consideration of the following description and the accompanying drawings.

DRAWINGS

Figures

Figure 1:
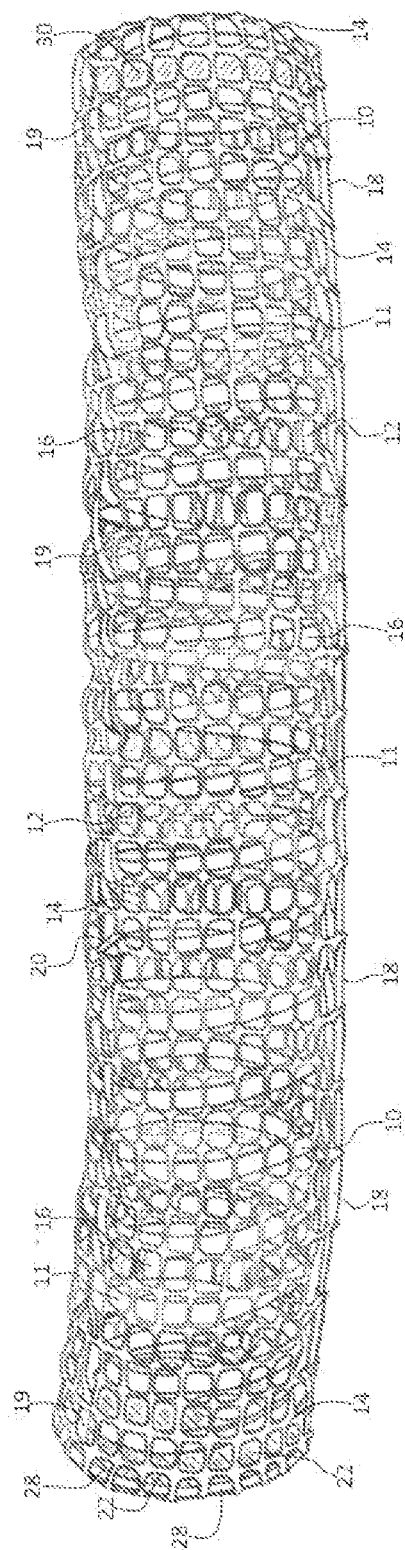
FIG. 1 shows a side view of a semirigid-spiral form also known as a spiral tube base that is surrounded by a flexible material having grid openings or geogrid material in accordance with one embodiment.

| Drawings - Reference Numerals | | | |
|---|---|---|---|
| 10 | spiral lube base | 11 | spiral rib |
| 12 | spiral opening | 14 | geogrid material |
| 15 | terminating or overlapping ends | 16 | geogrid opening |
| 18 | semirigid-Strip reinforcement | 19 | flexible reinforcement |
| 20 | fastener | 21 | small openings for fastener |
| 22 | inlet plate | 24 | intake-pipe cap |
| 26 | opening of intake-pipe cap | 28 | flexible tubing |
| 30 | end plate | | |

DETAILED DESCRIPTION

FIG. 1 to FIG. 6—First Embodiment

One embodiment of the leaching tube is illustrated in FIG. 1 to FIG. 6. The leaching tube is comprised of a spiral tube base 10 consisting of a solid pipe comprised of polyvinyl chloride, or PVC, or comprised of a material suitable for effluent or water and underground applications. The diameter of the spiral tube base 10 is adjustable based on need and could range from a few inches (several centimeters) to a few feet (or one meter) in diameter. One embodiment is illustrated in FIG. 1 to FIG. 6 and consists of a 10-inch spiral tube base 10 (approximately 25.5 cm). One continuous spiral form remains with spiral ribs 11 (FIG. 4) that comprise the one continuous spiral form when a solid PVC pipe is cut into a spiral shape. In one embodiment, a miter saw was used to cut the continuous spiral form from the 10-inch (25.5 cm) PVC pipe. The miter saw was modified to cut a pipe of 10-inches (25.5 cm) in diameter and a blade was used that is suitable for cutting PVC pipe of at least one-half of an inch (1.27 cm) to one inch (2.54 cm) in thickness. The thickness of the PVC pipe or a pipe suitable for effluent or water and underground applications can vary based on the use and the application of the leaching tube. The pipe is cut into a spiral shape with precision by holding and rotating the pipe as it is being cut on the saw. The spiral tube base 10 was made by Garry W. Miles of Lombard, Ill. The size of the spiral openings 12 (FIG. 4) or the distance between the spiral ribs 11 can vary based on the length and the diameter of the pipe and on the use and application of the leaching tube. In one embodiment, the spiral ribs 11 are spaced approximately three inches (7.62 cm) apart from each other (FIG. 4) and the spiral tube base 10 comprises one continuous spiral of PVC pipe or other similar material that is approximately one and a half inches (3.81 cm) in width.

Figure 2:
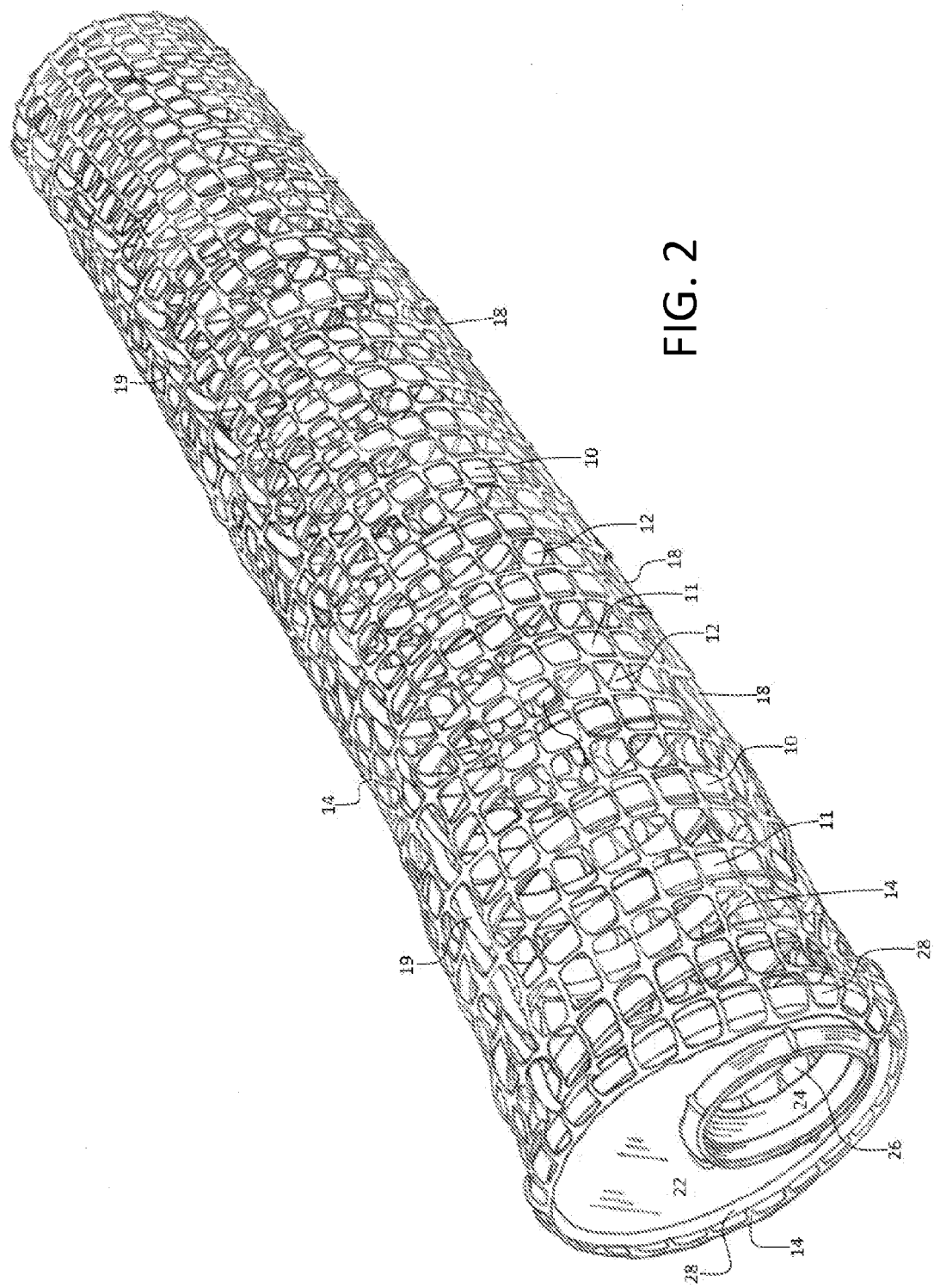
FIG. 2 shows a top perspective view from the front or intake side of the spiral tube base surrounded by the flexible geogrid material where an inlet plate and an intake-pipe cap with a hole for a distribution pipe from the septic tank is located in accordance with one embodiment.
Figure 4:
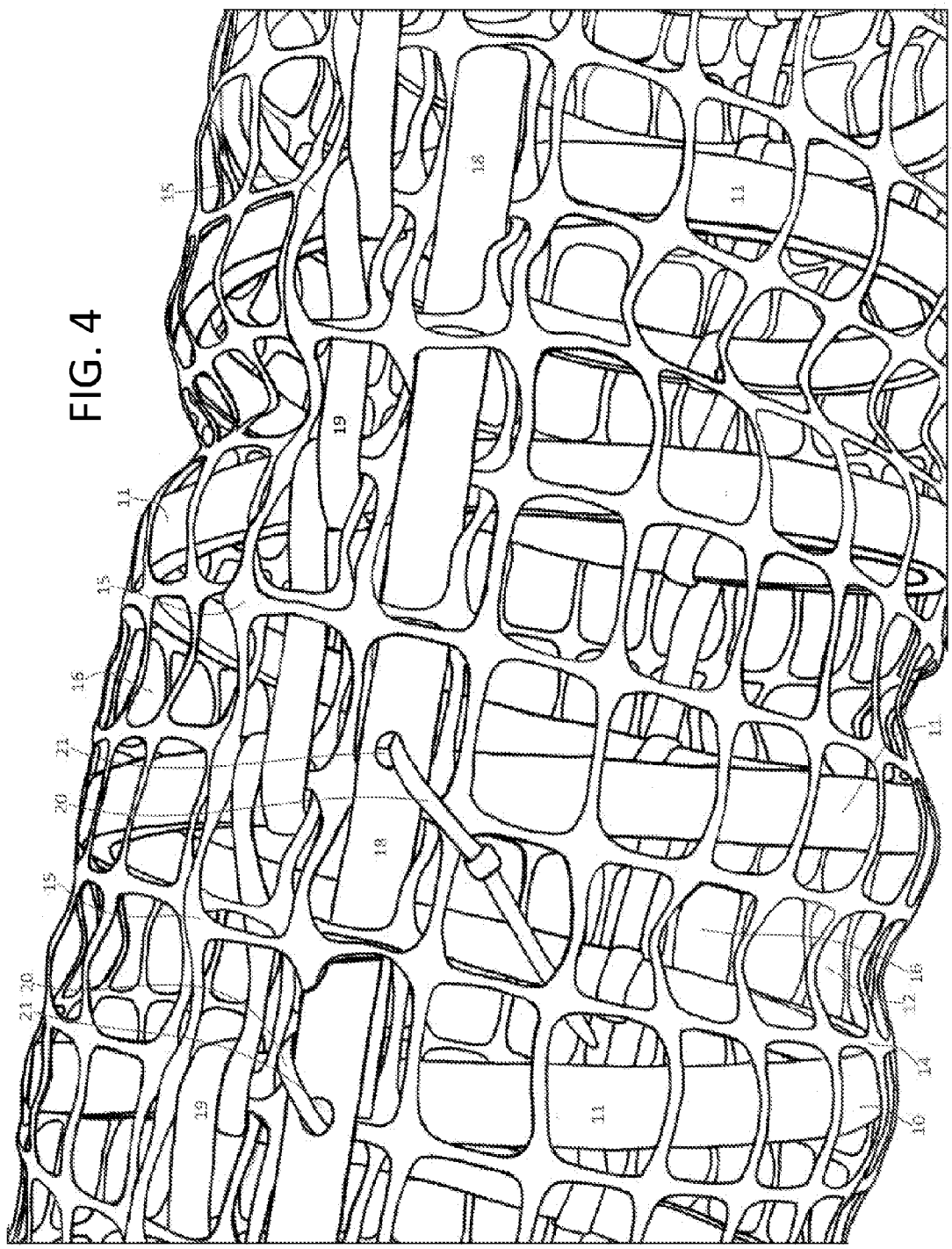
FIG. 4 shows an enlarged partial view of the spiral tube base with a semirigid-strip reinforcement weaved through the geogrid material and a fastener used to secure the geogrid material and the semirigid-strip reinforcement to the spiral rib through the small opening for a fastener in accordance with one embodiment.
Figure 5:
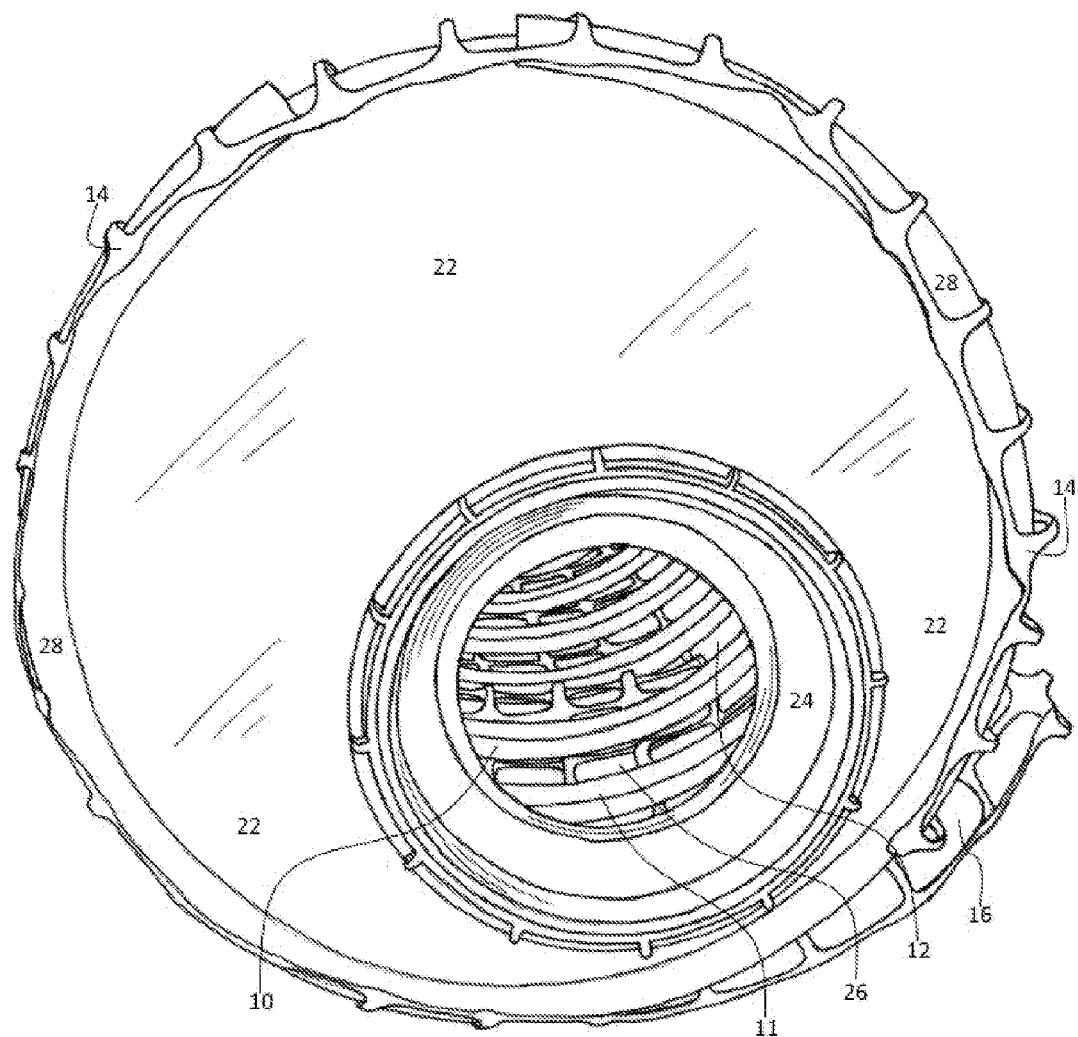
FIG. 5 shows an enlarged orthogonal view from the front or intake side of the inlet plate with flexible tubing around the circumference of the inlet plate and the intake-pipe cap within the inlet plate that contains an opening in the intake-pipe cap for the distribution pipe from the septic tank in accordance with one embodiment.
Figure 6:
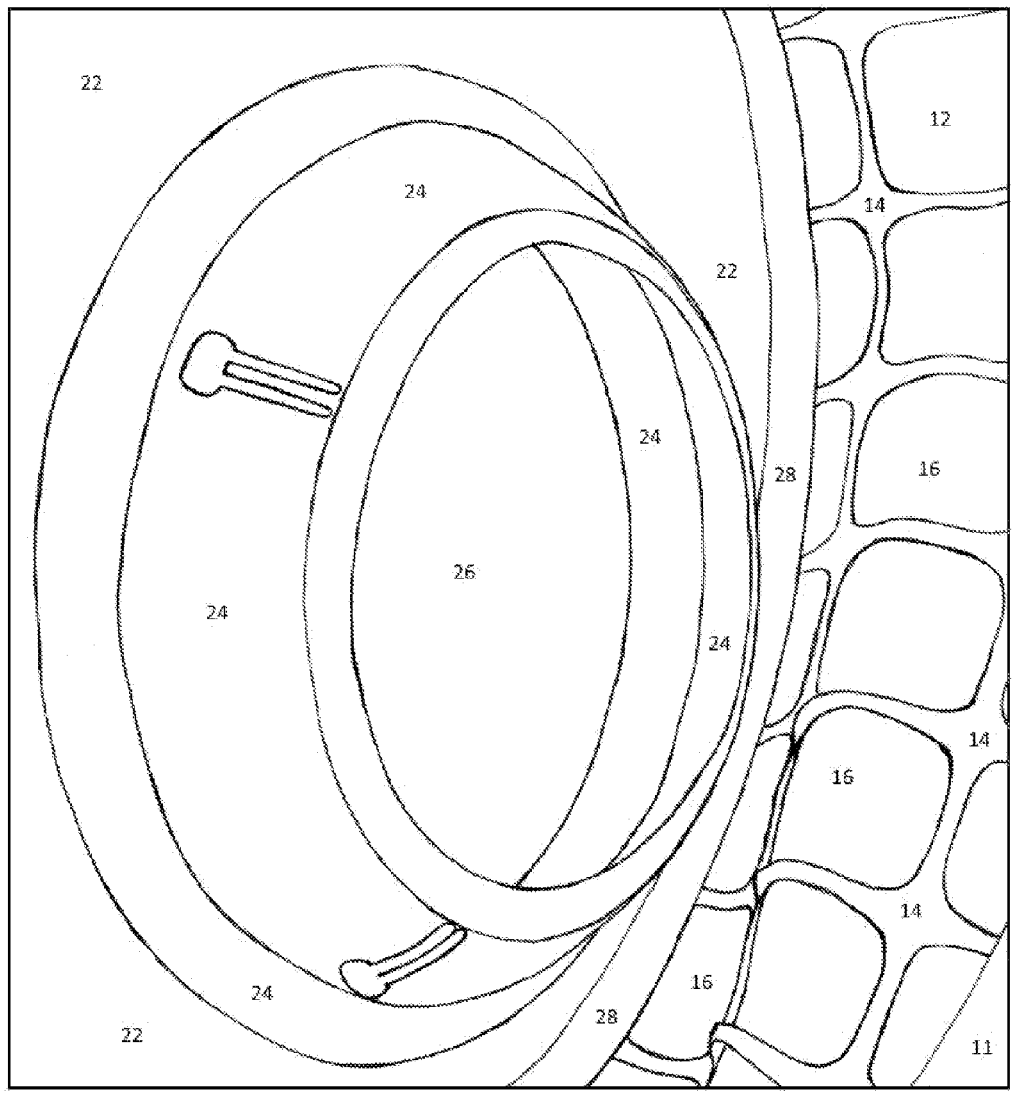
FIG. 6 shows an enlarged perspective view of the back side of the intake-pipe cap from the inside of the spiral tube base in accordance with one embodiment.

FIG. 2 shows a top perspective view of one embodiment of the leaching tube. Geogrid material 14 is wrapped around the spiral tube base 10, except for the inlet plate 22 and end plate 30, and consists of a flexible geosynthetic material with a repeating grid structure of rectangular-shaped openings (geogrid opening 16). Geogrid material 14 is commonly used in construction-grading applications for ground stabilization and soil reinforcement, and is particularly useful for stabilizing sloped areas. In one embodiment, the geogrid material 14 is available from Tensar® Corp. of Alpharetta, Ga., which manufactures geogrid material infused with fiberglass for strength and long-term durability. However, geogrid material 14 is also available through many Internet retailers. The geogrid material 14 can consist of any material with repeating openings that is suitable for effluent and underground applications and that is flexible enough to wrap around the spiral tube base 10. In one embodiment, the geogrid opening 16 is approximately one to one and a half inches (2.5 to 4 cm) wide (FIG. 4). The geogrid opening 16 has a wide range of variability in size, and is available anywhere from one centimeter to several centimeters in length and width. The wide range of variability in the size of the geogrid opening 16 allows for the adjustment of the geogrid material 14 based on soil conditions and based on the use and application of the leaching tube.

In one embodiment, one semirigid-strip reinforcement 18 (FIG. 4) is used to secure the geogrid material 14 to the spiral tube base 10. The rigid reinforcement 18 is a strip of material comprised of polyvinyl chloride, or PVC, that is approximately one-sixteenths of an inch (0.15 cm) in thickness and approximately one inch (2.54 cm) in width and is woven longitudinally through only the geogrid material 14 (FIG. 4). The semirigid-strip reinforcement 18 can be made from any material that is suitable for burial within the earth and that is of sufficient rigidity to hold the terminating or overlapping ends 15 of the geogrid material 14 (FIG. 4) down longitudinally along the spiral tube base 10. A small opening for a fastener 21 is placed at various spots along the semirigid-strip reinforcement 18 near a spiral rib 11 to allow a fastener 20 to be threaded through the hole to secure the geogrid material 14 to the spiral tube 10 (FIG. 4). It is contemplated that the semirigid-strip reinforcement 18 might be unnecessary when the geogrid material 14 is capable of being molded onto the spiral tube base 10 or when both materials are capable of being fabricated.

Figure 3:
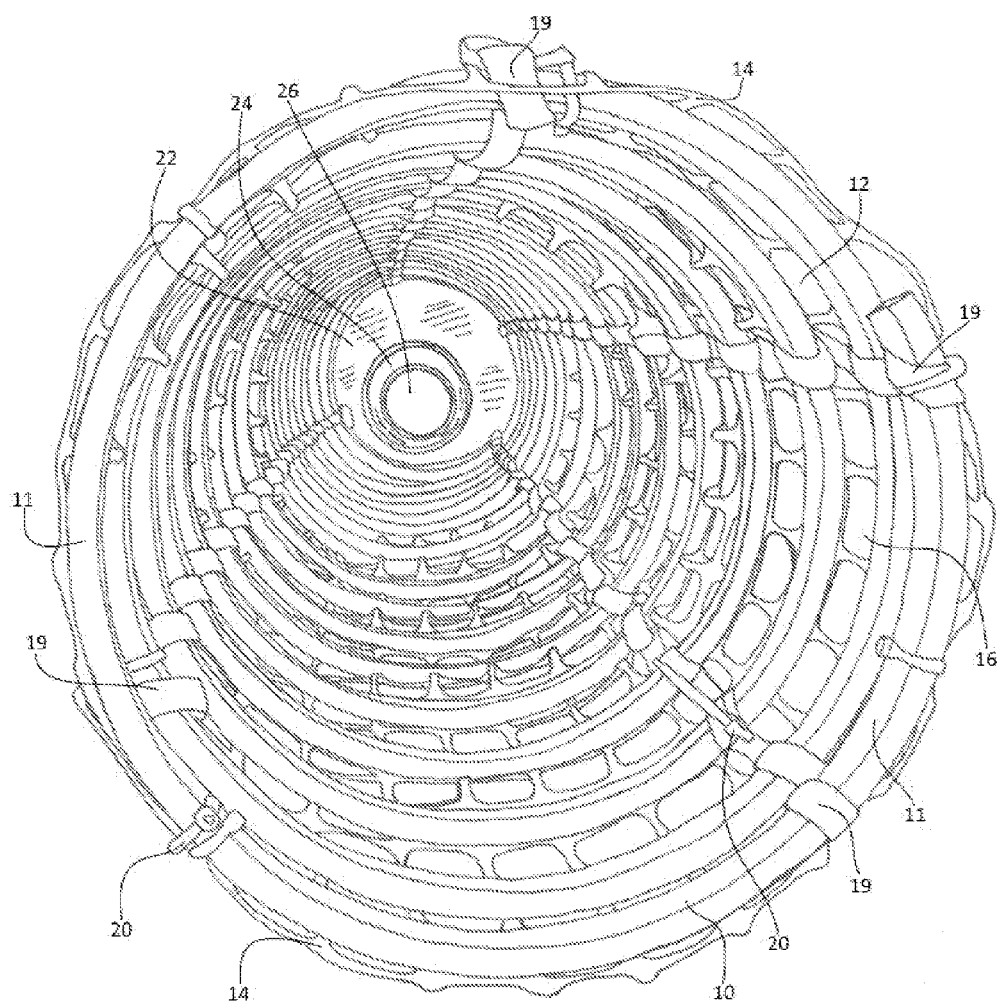
FIG. 3 shows an enlarged view of the inside of the spiral tube base from the end or distal side with an orthogonal view of the inlet plate and the intake pipe cap from the inside and a view of flexible reinforcements weaved around the spiral ribs in accordance with one embodiment.

In one embodiment of the leaching tube, the geogrid material 14 is attached to the spiral tube base 10 by the use of fasteners 20 (FIG. 3 and FIG. 4). The fasteners 20 consist of nylon cable ties or can consist of any other securing mechanism that attaches the geogrid material 14 to the spiral tube base 10 and that is made of material suitable for burial within the earth, including securing mechanisms such as hog rings. Fasteners 20 are looped through small openings for fasteners 21 along the semirigid-strip reinforcement 18 at various points to secure the geogrid material 14 to a spiral rib 11. (FIG. 4) It is contemplated that fasteners 20 may be unnecessary when the geogrid material 14 can be molded onto the spiral tube base 10 or when both materials can be fabricated.

In one embodiment, four flexible reinforcements 19 (FIG. 3 and FIG. 4) are placed at approximately equal distance apart around the spiral tube base 10 and are woven longitudinally along the length of the tube through the geogrid material 14 wrapping once around each spiral rib 11. The flexible reinforcements 19 consist of strips of flexible material comprised of heavy-duty plastic about one inch (2.54 cm) in width. However, flexible reinforcements 19 can consist of any material that can be repeatedly bent without fracturing, such as polyethylene, polypropylene, nylon, and various plasticized materials, and any material suitable for burial within the earth. The four flexible reinforcements 19 secure the geogrid material 14 to the spiral tube base 10. It is contemplated that flexible reinforcements 19 might be unnecessary when the geogrid material 14 can be molded onto the spiral tube base 10 or when both materials can be fabricated.

In one embodiment, an inlet plate 22 (FIG. 2 and FIG. 5) covers an intake end of a chain of leaching tubes, which is an opening on one side of the spiral tube base 10. The inlet plate 22 consists of a sheet of rigid PVC material that is approximately one-quarter of an inch (0.635 cm) in thickness and is cut to fit a circular opening of the spiral tube base 10. The inlet plate 22 can consist of any material of sufficient rigidity that is suitable for burial within the earth. The inlet plate 22 is necessary only for holding into place an intake-pipe cap 24, which holds the distribution pipe (not shown) into place from the septic tank (not shown).

In one embodiment of the leaching tube, a hole of a circular shape is cut into the inlet plate 22 to insert an intake-pipe cap 24 (FIG. 5 and FIG. 6) that contains an opening cut into the intake-pipe cap 24 to accommodate the distribution pipe from a septic tank. In one embodiment, the intake-pipe cap 24 consists of a four-inch (10.16 cm) D-box seal that is made of low-density polyethylene (LDPE) and Polypropylene (PP) and is available from Polylok Inc. of Wallingford, Conn. There are various sizes of D-Box seals available to accommodate the various diameters of the distribution line from the septic tank. However, the intake-pipe cap 24 can be made from any product or material, such as rubber, nylon, polyethylene, polypropylene, etc. that is capable of holding the distribution pipe into place. It is contemplated that the intake-pipe cap 24 could be molded onto the inlet plate 22 or that both the inlet plate 22 and intake-pipe cap 24 could be fabricated as one piece.

In one embodiment, an end plate 30 (FIG. 2) covers a distal end of a chain of leaching tubes. The end plate 30 consists of the same material as the inlet plate 22 and is a solid circular piece without any holes that is cut to fit the circular opening of the leaching tube at the distal end of the chamber line. The end plate 30 is used only at the end of a succession of leaching tubes that are connected together underground to form one long tube line for the purpose of filtering the effluent into the surrounding soil.

In one embodiment, flexible tubing 28 is used around the inlet plate 22 and the end plate 30 and is comprised of a solid, hollow tube of rubber that is flexible and that is approximately three-eighths of an inch (0.9525 cm) in diameter. The flexible tubing 28 can consist of any material that is suitable for burial within the earth and that provides enough friction for the inlet plate 22 to be properly secured to the opening of the spiral tube base 10. In one embodiment, one longitudinal, or lengthwise, cut is made along the rubber tube to create an opening that allows it to be inserted around most of the circumference or outside edge of the inlet plate 22 and the end plate 30. The flexible tubing 28 provides friction for the geogrid material 14 to protrude over the inlet plate 22 and end plate 30 to allow the terminating or overlapping 15 ends of the geogrid material 14 (FIG. 5) to be secured with fasteners 20 (FIG. 3 and FIG. 4). It is contemplated that flexible tubing 28 or similar material might be unnecessary when either the inlet plate 22 or end plate 30 can be molded onto the spiral tube base 10 or when both materials can be fabricated.

Operation—FIG. 1 to FIG. 6

The manner of using the leaching tube is very similar to that for gravelless arch-shaped leaching chambers in present use. First, a trench is dug into the ground where the drain or leach field will be located (usually several trenches are dug). The depth, width, and length of the trench are based on the size of the drain field and the size of the leaching chamber, as well as local and state regulations. Next, the leaching tube is placed within the trench. Typically, several or more leaching tubes are connected end to end, forming a long chain of leaching tubes inside of the trench. However, the leaching tubes could also be stacked on top of each other with sufficient space underground. Typically, a leaching tube that would be stacked on top of or adjacent to another leaching tube would be of a smaller diameter, such as four inches (10.16 cm). The number of leaching tubes that are necessary depends on the size of the drain field. The leaching tubes can be connected end to end with fasteners 20 to form a long chain of leaching tubes. The leaching tubes can also be connected side-by-side or stacked with the use of fasteners 20 as well. It is contemplated that the need for fasteners will be eliminated when the leaching tube is fabricated to allow for one leaching tube to be attached, connected, or hooked onto the subsequent leaching tube. An end plate 30 is placed at the distal end of the final or terminating tube of the chain of leaching tubes.

Next, the distribution pipe from the septic tank is inserted into the intake-pipe cap 24. Under certain circumstances, rosin paper could be placed on top of the chain of leaching tubes before the replacement of topsoil over the trench. Rosin paper is useful to provide structure to the disturbed topsoil above the leach field and to prevent too much of that disturbed topsoil from entering the leaching tube during and after installation. Rosin paper provides time for the disturbed topsoil to settle, or reestablish its structure, so that less top soil enters the leaching tube, which improves the exfiltration capabilities. Rosin paper is a biodegradable material that eventually disintegrates and does not need replacement.

Typically, several inches of topsoil are placed on top of the leaching tubes, then sod is installed or the lawn is reseeded, so that the leach field is hidden and otherwise looks like an undisturbed area. The depth of topsoil above a leach or drain field varies based on local and state regulations.

Additional Embodiments

It is contemplated that some or all of the parts of the leaching tube (including any additional embodiments), that are illustrated in FIGS. 1 to 6 and that are listed in the Reference Numerals, will be molded together or fabricated, which will allow for a faster manufacturing and installation process. For example, it is contemplated that the need for fasteners 20 and reinforcements will be unnecessary when the geogrid material 14 can be molded onto the spiral tube base 10.

It is also contemplated that to improve the filtration and percolation of the effluent while using any gravelless leaching chamber, including the leaching tube, that air could be pumped into the leaching tube or gravelless leaching chamber. Air is pumped into the leaching tube or gravelless leaching chamber via a solid-hollow tube consisting of rubberized plastic or of any material that is suitable for burial within the earth and that is approximately one inch (2.54 cm) or less in diameter. The tube, or underground oxygenating tube, is perforated with small holes that allow the air to escape the tube at various points throughout the septic treatment system, including within the drain field.

The underground oxygenating tube runs from an air pump above-ground that is located near the septic tank (and is hidden by the use of a plastic decorative landscape stone), then into and through the septic tank, distribution pipe, and terminates at some point within the leaching tube or gravelless chamber.

Alternative Embodiments

There are various possibilities with regard to the size of the openings of the geogrid material 16. An enlarged view of the geogrid material 14 is illustrated in FIG. 4. This illustration shows a geogrid opening 16 of approximately one and a half inches (3.81 cm) in width. The geogrid openings 16 could range from a fraction of a centimeter wide to several or more centimeters wide. The geogrid material 14 can consist of any material that is of sufficient flexibility to be wrapped around the spiral tube base 10 and that is suitable for burial within the earth, which includes material that consists of polymer materials, such as polyethylene, polypropylene, and material that consists of polyethylene-coated polyester fibers. The geogrid material 14 can also consist of material that uses a laser or ultrasonically bonding together polyester or polypropylene rods or straps in a grid pattern. Additionally, the geogrid material 14 can be substituted with mesh-filter or geotextile fabric that would surround the spiral tube base 10 similar to the geogrid material 14 if the cost or access to geogrid material 14 is prohibitive. The mesh-filter or geotextile fabric can consist of any material suitable for burial within the earth.

The spiral tube base 10 can consist of any pipe of various lengths, widths, diameters, and thicknesses and that is suitable for burial within the earth. The spiral tube base 10 can also consist of any material that is able to be cut, formed, fabricated, molded, or shaped into a spiral tube and that has sufficient flexibility and sufficient rigidity to maintain its spiral shape over time.

Advantages

From the description above, a number of advantages of some embodiments of the leaching tube become evident:

(a) The use of the geogrid material provides stability and structure to the surrounding soil within the drain field and provides stability and structure in areas where the drain field is in a sloped location.

(b) The openings of the geogrid material can be modified based on the suitability of the environment within the drain field. For example, the use of very small geogrid openings will be necessary for finer or sandier soil or for soil that contains a lot of rocks. Larger geogrid openings can be used for typical soil, which allows for a higher rate of filtration and percolation of the effluent. Percolation defined as the movement of the effluent from within the underground chamber or tube to the surrounding soil. Filtration defined as the process of removing harmful contaminants from the effluent.

(c) The use of the geogrid material combined with a spiral tube provides strength and long-lasting durability to the drain field. The spiral design and rigidity of the tube prevents the leaching tube from collapsing over time. The design of the spiral tube along with the use of lightweight geogrid material or geotextile material makes the leaching tube lightweight, which allows for faster installation and reduced transportation costs.

(d) The openings of the geogrid material and the openings between the spiral ribs of the leaching tube provide 360 degrees of filtration and percolation of effluent.

(e) The spacing between the spiral ribs of the leaching tube is modifiable to the needs of the user. If the spiral ribs are close together, the leaching tube will provide more structure to the surrounding soil, but might slow filtration and percolation of the effluent. Conversely, if the spiral ribs are spaced farther apart, the leaching tube will provide less structure to the surrounding soil, but might increase filtration and percolation of the effluent.

(f) The use of a modifiable intake-pipe cap combined with the modifiable openings of the geogrid material or geotextile fabric combined with the semirigid-spiral element make the leaching tube very versatile based on the needs of the user.

(g) The 360-degree design of the leaching tube allows maximum removal of the harmful gases and contaminants within the effluent by increasing the oxygenation of the effluent and by increasing the area in which the effluent comes into contact with the surrounding soil, which is the primary purifier of effluent.

CONCLUSION, RAMIFICATIONS, AND SCOPE

Accordingly, the reader will see that the leaching tube of the various embodiments provides a more efficient, reliable, and lightweight version of the gravelless leaching chamber. The leaching tube is easy to manufacture based on its design, is easy to transport and install because it is lightweight, and is easy to modify based on the needs of the user.

Furthermore, the semirigid-spiral tube combined with the geogrid or geotextile material has the additional advantages that:

it permits a variety of additional or alternative embodiments that allow consumers to tailor the leaching tube to their needs;

it permits a variety of sizes in length, in diameter, and in thickness of the semirigid-spiral tube or element;

it provides flexibility with regards to the spacing between the spiral ribs that allows the consumer to use a spacing that is suitable based on need;

it permits 360-degree of filtration and percolation of the effluent as the result of the semirigid-spiral tube or element;

it provides structure 360-degrees around to the surrounding soil within the drain field as a result of the semirigid-spiral tube;

it provides additional structure to the surrounding soil with the combined use of the geogrid material and the semirigid-spiral tube or element;

it permits easier transport and installation because the components are very lightweight; and it provides long-term durability as a result of the design of the spiral tube, which reduces the need for replacement, unlike other gravelless leaching chambers.

Although the description above contains many specificities, this should not be construed as limiting the scope of any embodiment, but as merely providing descriptions of some of several embodiments. For example, the leaching tube can have different shapes other than the circle or oval shape of a pipe or tube and also can be shaped as a square, rectangle, or triangle, etc. The shape of the leaching tube can be changed when the semirigid-spiral tube or element is fabricated or molded and not cut from a PVC pipe. The geogrid material can also be molded onto the spiral tube or element, which could eliminate the need for separate fasteners and reinforcements. The geogrid material also can be substituted with mesh-filter or geotextile fabric that would surround the spiral tube or element in the same manner as the geogrid material and that also might reduce costs. The flexible tubing around the inlet plate and end plate could be eliminated if various connections to hold the plates in place could be molded or integrated onto the geogrid material or spiral tube or onto the plates themselves. The leaching tube can be made in modular sections, which would result in faster manufacturing, transportation, and installation. The manner of connecting the modular sections could be integrated or molded onto each end of the leaching tube. The modular sections of the leaching tube also can be connected with the use of various suitable fasteners.

Many other ramifications and variations are possible within the teachings of the various embodiments. For example, the semirigid-spiral tube or element can be different sizes, including various diameters, various lengths, and various thicknesses based on the needs of the consumer. The geogrid material can have different sized openings based on the needs of the consumer. The material surrounding the semirigid-spiral tube or element may comprise any material that has liquid leaching and percolating qualities and that can be used for burial within the earth with sufficient durability.

Thus the scope of the embodiments should be determined by the appended claims and their legal equivalents, and not by the examples given.

We claim:

1. A leaching tube assembly for burial in the earth to disperse effluent into surrounding soil having a spiral tube base with spiral ribs and spiral openings along the length of the spiral tube base, and a material having spaced apart openings wrapped around the spiral tube base, further including an inlet plate covering an intake end of said spiral tube base,
    wherein said inlet plate has an opening to hold an incoming pipe.
2. The leaching tube assembly of claim 1 wherein said spiral tube base is composed of polyvinyl chloride.
3. The leaching tube assembly of claim 1 wherein each of the spaced-apart openings has an open area equal to or greater than a 1 cm wide square opening.
4. The leaching tube assembly of claim 1 wherein said material is attached to said tube base with the use of fasteners.
5. The leaching tube assembly of claim 1 wherein said opening of said inlet plate is surrounded by a D-box seal.
6. The leaching tube assembly of claim 1 wherein said inlet plate is made from polyvinyl chloride.
7. The leaching tube assembly of claim 1 further including a semirigid reinforcement woven longitudinally along the outside of said spiral tube base through some of the spaced-apart openings of said material.
8. The leaching tube assembly of claim 7 wherein said semirigid reinforcement has openings for fasteners attaching said material to said spiral ribs.
9. The leaching tube assembly of claim 7 wherein said semirigid reinforcement is a tape-like strip of polyvinyl chloride.
10. The leaching tube assembly of claim 1 further including an end plate covering an end of said spiral tube base, opposite the intake end.
11. The leaching tube assembly of claim 10 wherein said end plate is made from polyvinyl chloride.
12. The leaching tube assembly of claim 1 wherein each of the spaced-apart openings has an open area equal to or greater than a 2.5 cm wide square opening.
13. The leaching tube assembly of claim 12 wherein said spiral tube base is composed of polyvinyl chloride.
14. The leaching tube assembly of claim 12 wherein said material is attached to said spiral tube base with the use of fasteners.
15. The leaching tube assembly of claim 12 wherein said opening of said inlet olate is surrounded by a D-box seal.
16. The leaching tube assembly of claim 12 further including a semirigid reinforcement woven longitudinally along the outside of said spiral tube base through some of the spaced-apart openings of said material.
17. The leaching tube assembly of claim 16 wherein said semirigid reinforcement has openings for fasteners attaching said material to said spiral ribs.
18. The leaching tube assembly of claim 16 wherein said semirigid reinforcement is a tape-like strip of polyvinyl chloride.
19. The leaching tube assembly of claim 12 further including a flexible reinforcement woven longitudinally through said material wrapping once around each said spiral rib.
20. The leaching tube assembly of claim 19 wherein said flexible reinforcement is a tape-like strip of flexible heavy-duty plastic.
21. The leaching tube assembly of claim 12 further including an end plate covering an end of said spiral tube base, opposite the intake end.
22. The leaching tube assembly of claim 21 wherein the circumference of said end plate is covered by a tube of rubber cut once longitudinally so as to insert the tube of rubber around said circumference of said end plate.
23. The leaching tube assembly of claim 1 wherein said inlet plate is surrounded by a flexible hollow tubing that is cut longitudinally and is inserted around the circumference of said inlet plate.
24. The leaching tube assembly of claim 23 wherein said flexible hollow tubing is made from rubber.
25. The leaching tube according to claim 1, wherein the spaced-apart openings are arranged in a repeating grid pattern.
26. The leaching tube according to claim 1, further comprising an air tube perforated with holes located within the spiral tube base.
27. The leaching tube according to claim 1, wherein the material is composed of a flexible geosynthetic material.
28. The leaching tube according to claim 1, wherein the material is a geogrid material.
29. A leaching tube assembly for burial in the earth to disperse effluent into surrounding soil having a spiral tube base with spiral ribs and spiral openings along the length of the spiral tube base, and a material having spaced apart openings wrapped around the spiral tube base, further including an inlet plate covering an intake end of said spiral tube base, wherein said inlet plate is surrounded by a flexible hollow tubing that is cut longitudinally and is inserted around the circumference of said inlet plate.

30. The leaching tube assembly of claim 29 wherein said flexible hollow tubing is made from rubber.

31. A leaching tube assembly for burial in the earth to disperse effluent into surrounding soil having a spiral tube base with spiral ribs and spiral openings along the length of the spiral tube base, and a material having spaced apart openings wrapped around the spiral tube base, further including a flexible reinforcement woven longitudinally through said material wrapping once around each said spiral rib.

32. The leaching tube assembly of claim 31 wherein said flexible reinforcement is a tape-like strip of flexible heavy-duty plastic.

33. A leaching tube assembly for burial in the earth to disperse effluent into surrounding soil having a spiral tube base with spiral ribs and spiral openings along the length of the spiral tube base, and a material having spaced apart openings wrapped around the spiral tube base, further including an end plate covering an end of said spiral tube base,
    wherein the circumference of said end plate is covered by a tube of rubber cut once longitudinally so as to insert the tube of rubber around said circumference of said end plate.

\* \* \* \* \*